United States Patent
Morisawa et al.

(10) Patent No.: US 7,100,440 B2
(45) Date of Patent: Sep. 5, 2006

(54) FLOW METER

(75) Inventors: Tatsuhide Morisawa, Tottori-ken (JP);
Hiroshi Momozane, Kurayoshi (JP);
Osamu Makino, Kurayoshi (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 11/118,114

(22) Filed: Apr. 29, 2005

(65) Prior Publication Data

US 2005/0241388 A1   Nov. 3, 2005

(30) Foreign Application Priority Data

Apr. 30, 2004   (JP) .............................. 2004-135963

(51) Int. Cl.
*G01F 1/68* (2006.01)
(52) U.S. Cl. ................................... 73/204.22
(58) Field of Classification Search ............ 73/204.22, 73/202, 202.5, 204.11
See application file for complete search history.

(56) References Cited

U.S. PATENT DOCUMENTS

| | | | |
|---|---|---|---|
| 4,616,505 A | | 10/1986 | Jouwsma |
| 4,776,214 A | * | 10/1988 | Moran et al. ............. 73/204.11 |
| 4,918,995 A | * | 4/1990 | Pearman et al. ......... 73/861.02 |
| 6,571,623 B1 | | 6/2003 | Blasczyk et al. |
| 6,647,809 B1 | * | 11/2003 | Okojie et al. ............ 73/861.85 |
| 6,865,938 B1 | * | 3/2005 | Pesahl et al. ............ 73/204.22 |

FOREIGN PATENT DOCUMENTS

| | | |
|---|---|---|
| EP | 0 465 182 | 1/1992 |
| JP | 6-66612 | 3/1994 |
| JP | 2003-240618 | 8/2003 |
| WO | WO-97/21986 | 6/1997 |

OTHER PUBLICATIONS

European Search Report for European Application No. EP 05 10 3335 dated Aug. 3, 2005, 3 pages.
Patent Abstracts of Japan, Publication No. 2003-240618 dated Aug. 27, 2003, 1 page.
Patent Abstracts of Japan, Publication No. 06-066612 dated Mar. 11, 1994, 1 page.

* cited by examiner

*Primary Examiner*—Jewel Thompson
(74) *Attorney, Agent, or Firm*—Osha Liang L.L.P.

(57) ABSTRACT

A compact and light flow meter having a rapid response includes a main body having a groove portion opened in the upper portion and also having connecting portions for communicating the groove portion and the exterior at both ends of the groove portion; a detachable cover body sealing the opened upper portion of the groove portion having a rectangular sectional shape in which a measured fluid is flowed; and a circuit substrate coming in close contact with the external face of the cover body. A sensor hole opened to the measuring chamber is arranged in the cover body; and a flow sensor is arranged in the circuit substrate so as to be arranged within the sensor hole and set a detecting face to face the measuring chamber.

8 Claims, 4 Drawing Sheets

FLOW METER

BACKGROUND OF THE INVENTION

1. Field of the Invention

The present invention relates to a flow meter.

2. Background Art

In a chip mounter, etc. for sucking an IC chip in a vacuum and holding and conveying the IC chip, it is judged whether the IC chip is appropriately sucked and held by monitoring the existence of an air flow of a vacuum flow path. When a compact and light flow meter is mounted to the head of such a chip mounter requiring a high speed operation and the existence of the air flow is monitored, high speed responsibility is more important than the accuracy of a flow rate. In patent literatures 1 and 2, the high speed responsibility is improved by devising the structure of a flow sensor.

[Patent literature 1] JP-A-6-66612

[Patent literature 2] JP-A-2003-240618

However, a fluid has inertia even when any high speed sensor is used. Accordingly, the fluid is intended to be continuously flowed within the flow meter even when the flow path is interrupted. Otherwise, the fluid is intended to stay in the same place even when the flow path is opened. Therefore, a problem exists in that a change in the flow velocity of a measured fluid within the flow meter is delayed and delay is caused in detection.

SUMMARY OF THE INVENTION

Therefore, an object of the present invention is to provide a compact and light flow meter having a rapid response.

To solve the above problems, the flow meter of the present invention comprises:

a main body having a groove portion opened in the upper portion and also having connecting portions for communicating the groove portion and the exterior at both ends of the groove portion;

a cover body detachably attached and constituting a measuring chamber in which the opened upper portion of the groove portion is sealed and a measured fluid having a rectangular sectional shape is flowed; and a circuit substrate coming in close contact with the external face of the cover body;

wherein a sensor hole opened to the measuring chamber is arranged in the cover body; and a flow sensor is arranged in the circuit substrate so as to be arranged within the sensor hole and set a detecting face to face the measuring chamber.

In accordance with this construction, the groove portion of the main body of the flow meter is sealed by the cover body and the measuring chamber having a rectangular sectional shape is constructed. Accordingly, while the connecting portions for connection to external piping, etc. for flowing the measured fluid are arranged at both ends of the measuring chamber in the flow meter, it is possible to arrange the measuring chamber for flowing the measured fluid and having a rectangular sectional area wider than that of the flow path of the connecting portion. Since the sectional area of the measuring chamber is increased and the flow velocity within the measuring chamber is reduced as much as possible, kinetic energy of the measured fluid is reduced and the measured fluid within the flow meter can be set to be rapidly stopped when the flow path is interrupted. Accordingly, the response of the flow meter can be set to a high speed response.

Further, in the flow meter of the present invention, the detecting face for measuring the flow velocity of the flow sensor may be arranged on the outer face side from the inner face of the cover body, or on the same plane as the inner face of the cover body.

In accordance with this construction, the detecting face of the flow sensor has no direction in which the upstream measured fluid is continuously flowed by inertia at the interrupting time of the flow path. Accordingly, the delay of a flow velocity change due to the inertia is small and the high speed responsibility of a flow rate measurement is excellent.

Further, in the flow meter of the present invention, net bodies may be engaged with grooves arranged in the main body and the cover body and may be fixed on the upstream side and the downstream side of the flow sensor of the measuring chamber.

In accordance with this construction, the flow of the measured fluid within the measuring chamber can be rectified by the net body. Further, since one end of the net body is engaged by arranging the groove in the cover body, there is no gap between the cover body and the net body, and no disturbance is caused in the upstream of the flow sensor. Thus, a high accuracy flow rate measurement can be made.

Further, in the flow meter of the present invention, the connecting portion may have a joint member constructed by a hard material.

In accordance with this construction, the connecting portion engaged with a joint, etc. for connection to the flow path of the measured fluid can be made compact and set to high strength so that the flow meter can be made compact and light in weight.

As mentioned above, in accordance with the present invention, it is possible to provide a compact flow meter light in weight and having a rapid response.

DESCRIPTION OF THE PREFERRED EMBODIMENTS

Figure 1:
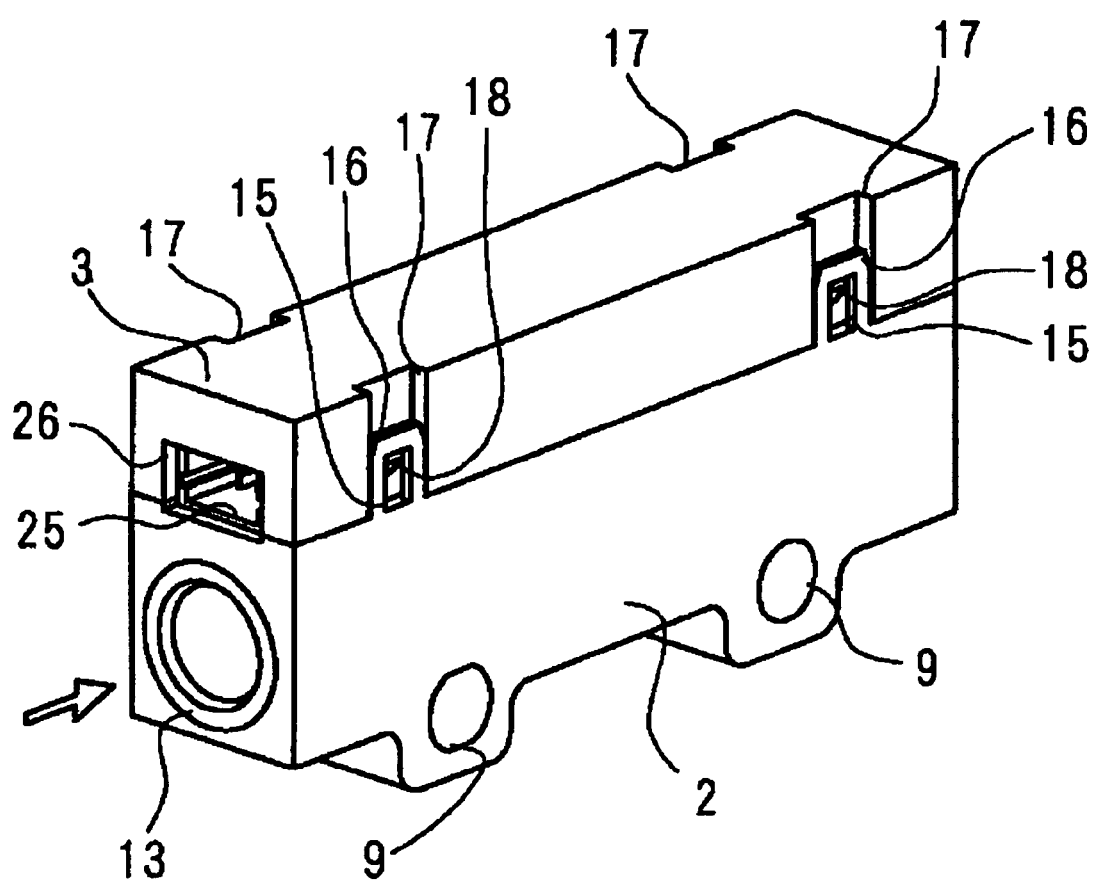
FIG. 1 is a perspective view of a flow meter in an embodiment mode of the present invention.
Figure 2:
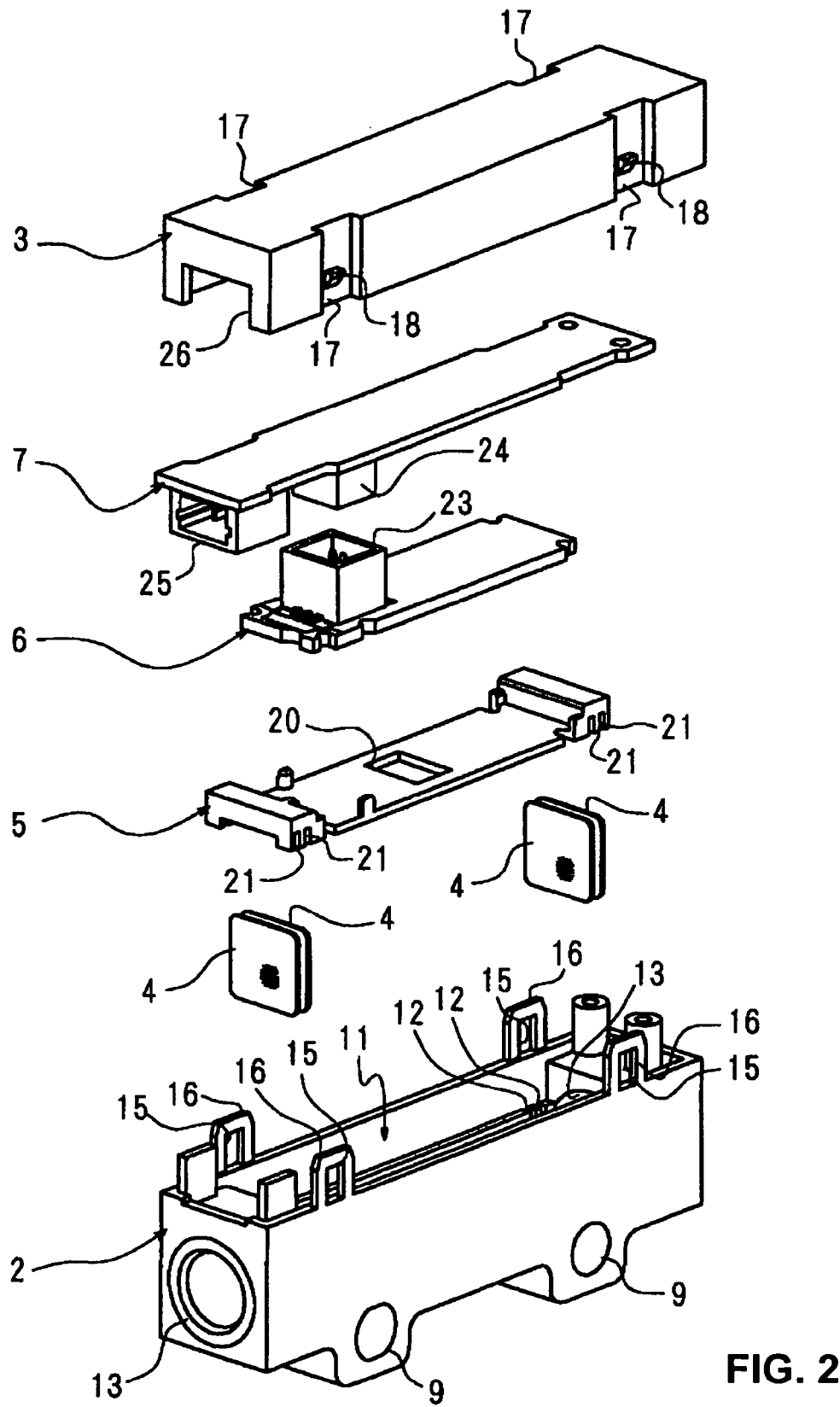
FIG. 2 is an exploded perspective view of the flow meter of FIG. 1.

FIG. 1 shows the external appearance of a flow meter 1 in an embodiment mode of the present invention. FIG. 2 shows a disassembled situation of the flow meter 1. The flow meter 1 approximately has a rectangular parallelepiped outer shape constructed by a main body 2 and a cover 3. Four net bodies 4 in total, a cover body 5, a first circuit substrate 6 and a second circuit substrate 7 are stored into the flow meter 1.

Figure 3:
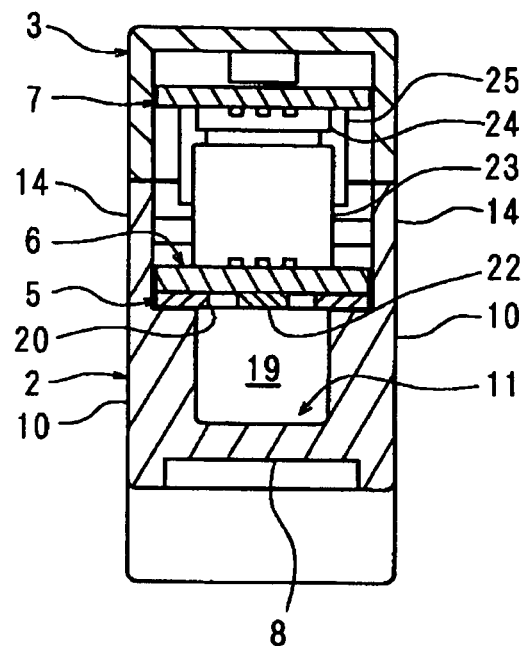
FIG. 3 is a sectional view of the flow meter of FIG. 1 in a flow perpendicular direction.
Figure 4:
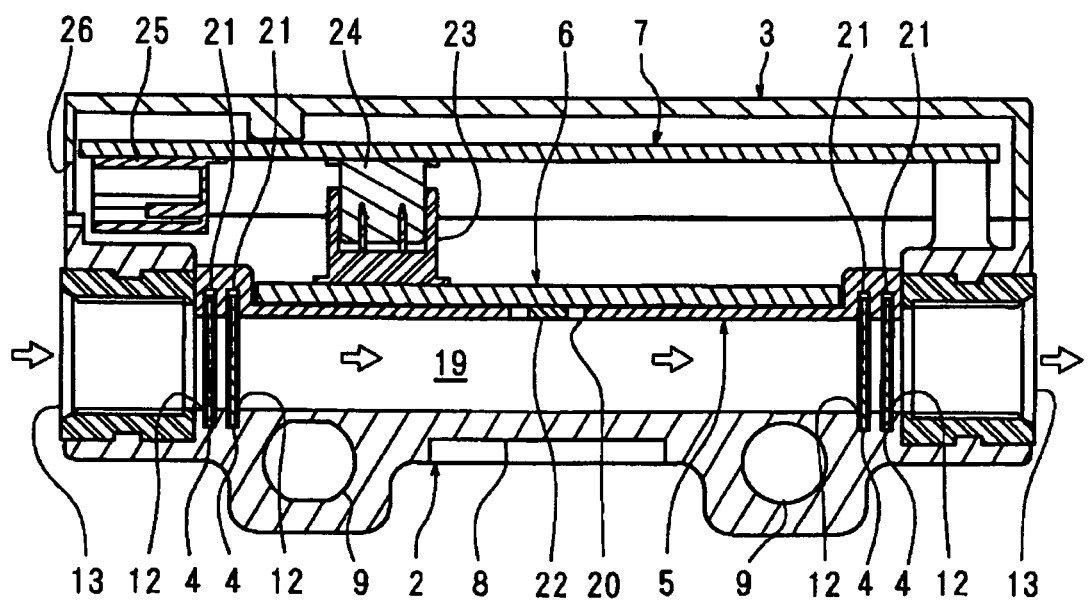
FIG. 4 is a sectional view of the flow meter of FIG. 1 in a flow direction.

Further, the construction of the flow meter 1 will be explained in detail with reference to FIG. 3 showing a cutting situation in the short direction in the central portion of the flow meter 1, and FIG. 4 showing a cutting situation in the long direction.

The main body 2 has two attaching holes 9 in a bottom wall 8. Further, the main body 2 has a groove portion 11 in which the upper portion constructed by the bottom wall 8 and side walls 10 on both sides is opened. Two thin grooves 12 perpendicular to the longitudinal direction are arranged near each of both ends of the groove portion 11. Further, a joint member 13 having circular screw holes manufactured by a metal at both ends of the groove portion 11 is buried at a molding time so as to communicate the interior of the groove portion 11 and the exterior of the main body 2 and is molded by resin. The outside of the upper end of the side wall 10 is further extended above the groove portion 11, and forms a guide wall 14. An elastic piece 16 having an engaging hole 15 is projected at each of the upper ends of both the guide walls 14.

A concave groove 17 is formed on the side face of the cover 3. An engaging projection 18 engaged with the engaging hole 15 of the above elastic piece 16 is projected in the bottom of the concave groove 17.

The net body 4 is greater by a turn than the section of the groove portion 11, and is a mesh manufactured by a metal and having a rectangular shape and engaged with the groove 12.

The cover body 5 is arranged within the guide wall 14, and constitutes a measuring chamber 19 in which an opening portion of the upper portion of the groove portion 11 is sealed and a measured fluid having a rectangular sectional shape is flowed. A sensor hole 20 opened to the upper portion of the measuring chamber 19 is arranged at the center of the cover body 5. A thin groove 21 is arranged so as to be connected to the groove 12 of the main body on the inner face of the measuring chamber 19 near both ends of the cover body 5. The groove 21 is engaged with the upper end of the net body 4.

The first circuit substrate 6 is arranged so as to come in close contact with the outer face of the cover body 5 in the upper portion of the cover body 5, and seals the sensor hole 20 of the cover body 5. A flow sensor 22 is arranged on the lower face of the first circuit substrate 6 so as to be arranged within the sensor hole 20. A male type internal connector 23 is arranged on the upper face of the first circuit substrate 6.

In the second circuit substrate 7, a female type internal connector 24 engaged with the male type internal connector 23 of the first circuit substrate is arranged on the lower face of the second circuit substrate 7. An external connector 25 is further arranged in the second circuit substrate 7. The flow meter 1 can be electrically connected to an external control device through a connector hole 26 formed in the cover 3.

Figure 5:
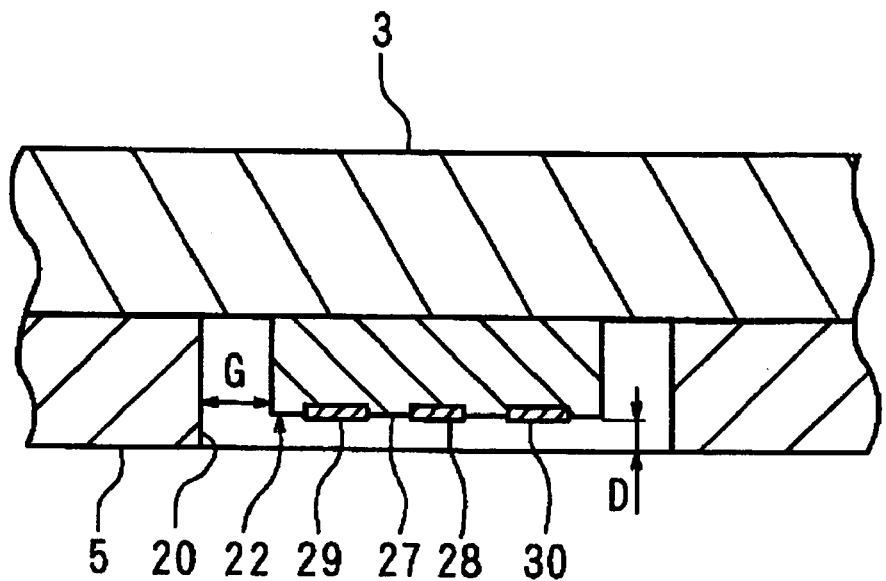
FIG. 5 is a partial enlarged view of a flow sensor of FIG. 4.

FIG. 5 shows a situation in which a portion of the flow sensor 22 of FIG. 4 is enlarged. In the flow sensor 22, a heating body 28 and measuring temperature bodies 29, 30 located before and after the heating body 28 are arranged on a detecting face 27. The flow sensor 22 is constructed by a thermal type flow sensor chip in which the flow velocity is calculated from the difference in temperature between before and after the heating body 28 by measuring the temperature of the measured fluid by the measuring temperature bodies 29, 30. The detecting face 27 of the flow sensor 22 is arranged so as to be located outside the measuring chamber 19 by a distance D (about 0.05 mm) from the inner face of the cover body 5. The sensor hole 20 has a size able to form gaps G (about 0.7 mm) on both sides of the flow meter 1 in the longitudinal direction in the flow sensor 22.

In the flow meter 1 having the above construction, the joint member 13 is connected to the flow path of the measured fluid and is fixed by the attaching hole 9 so as to flow the measured fluid in the direction of the arrow shown in FIG. 1. As shown in FIG. 4, the measured fluid is flowed from the direction of the arrow to the joint member 13, and is rectified through two net bodies 4, and passes through the measuring chamber 19 and is further flowed out through two net bodies 4 and the joint member 13. The flow rate of the measured fluid is measured by the flow sensor 22 while the measured fluid passes through the measuring chamber 19. Thus, it is possible to detect interruption and opening of the flow path connected to the flow meter 1.

In the flow meter 1, the groove portion 11 opened in the upper portion is arranged in the main body 2, and the measuring chamber 19 is constructed by sealing the groove portion 11 by the cover body 5. Accordingly, it is not necessary to arrange a trimming die for molding so as to extend one end of the measuring chamber 19 to the exterior. Therefore, it is possible to integrally mold a connection portion having a flow path thinner than the measuring chamber 19 before and after the measuring chamber 19. The measuring chamber 19 can be set to a rectangular sectional shape so as to maximize the sectional area within the rectangular parallelepiped flow meter 1 without being restrained to the structure of the connecting portion. Thus, the flow velocity of the measured fluid within the measuring chamber 19 is lowly restrained and kinetic energy of the measured fluid can be reduced. Therefore, when the flow path is interrupted in the exterior of the flow meter 1, the measured fluid within the measuring chamber 19 is small in inertia force and is rapidly stopped. Thus, the flow meter 1 can rapidly detect the stoppage of the fluid by the flow sensor 22. Further, when the flow rate is instantaneously increased, it is not necessary to greatly accelerate the measured fluid within the measuring chamber 19. Accordingly, the influence of the inertia is small and it is possible to achieve a stationary speed for a short time, and the flow meter 1 can detect a speed change of the measured fluid for a short time.

The flow of the measured fluid within the measuring chamber 19 is different in speed in accordance with places, and is approximately stopped due to friction in positions adjacent to the bottom wall 8 of the main body 2, the side wall 10 and the cover body 5. A flow velocity distribution for maximizing the flow velocity at the center of the measuring chamber 19 can be formed. In the flow meter 1, the detecting face 27 of the flow sensor 22 is arranged slightly outside the inner face of the cover body 5 (may be also arranged on the same plane as the inner face of the cover body 5). Accordingly, the flow rate is measured by heat transfer due to the measured fluid having a comparatively low flow velocity near the cover body 5. Therefore, even when the flow rate is instantaneously changed, the delay of the detection due to the inertia of the measured fluid is reduced so that a high speed response is obtained.

The groove 20 and the groove 21 are arranged in the bottom wall 8 of the main body 2, the side wall 10 and the cover body 5 near both ends of the measuring chamber 19. The net bodies 4 are engaged with these grooves and are fixed. Therefore, the flow of the measured fluid within the measuring chamber 19 is rectified by passing through the net bodies 4 and becomes a stable laminar flow approximately having no turbulent flow, and the flow rate can be measured with high accuracy. In particular, when there is a gap between the cover body 5 and the net body 4, the measured fluid entering from the gap becomes an irregular disturbance, and this disturbance is flowed toward the flow sensor 22. Therefore, this disturbance becomes a cause of a reduction in measuring accuracy. However, since the groove 21 is arranged in the cover body 5 and the net body 4 is engaged with the groove 21 in the flow meter 1, no gap is generated between the cover body 5 and the net body 4. Therefore, no flow near the flow sensor 22 is disturbed and the measuring accuracy is high.

In the flow meter 1, the connecting portion for connection to the flow path is integrally molded by burying the joint member 13 in molding the main body 2 by resin. Since the joint member 13 obtained by precisely processing a hard material is used, a structure of the connecting portion smaller than that formed by the resin molding and high in strength and precise and having a high general purpose property is obtained. Thus, the flow meter 1 is compact and light in weight. The joint member 13 can be buried and molded since the measuring chamber 19 is constructed by the groove portion 11 arranged in the main body 2 and the cover body 5 so that it is not necessary to arrange a trimming die for molding the measuring chamber 19 in the connection portions at both ends of the measuring chamber 19 as mentioned above.

Figure 6:
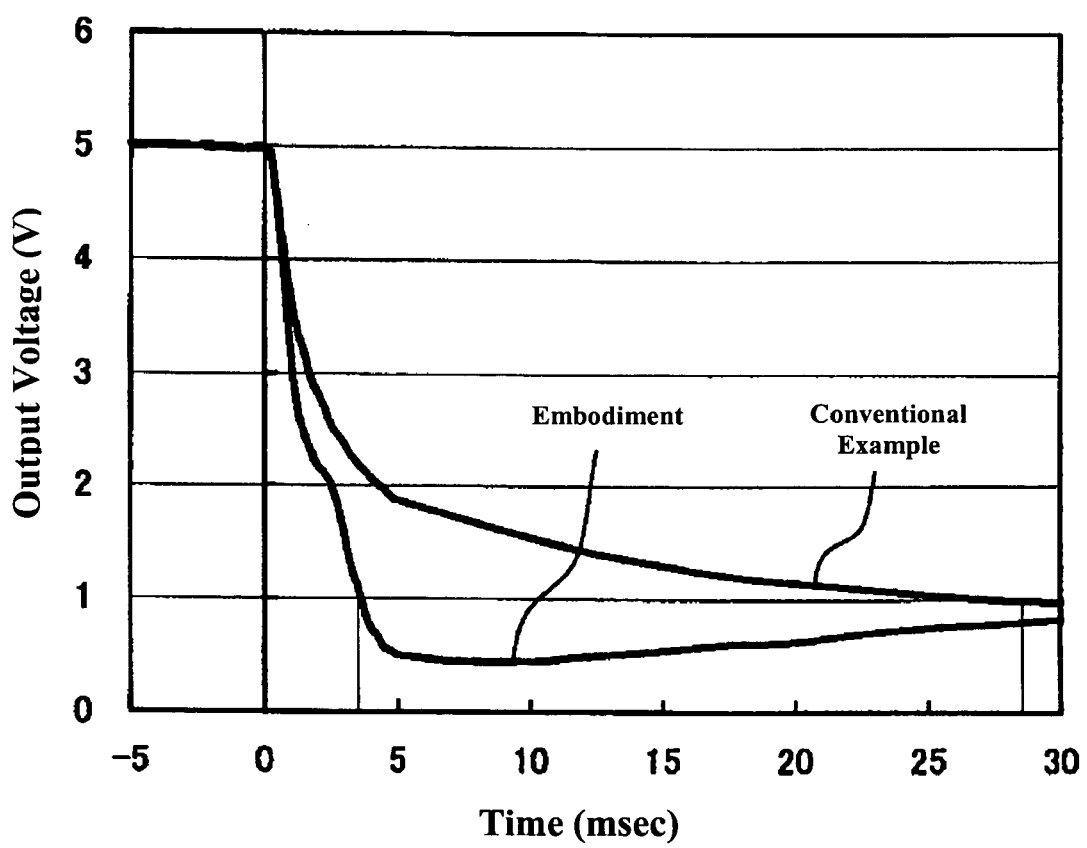
FIG. 6 is a graph showing output waveforms of the flow meter of the present invention and a conventional flow meter.

FIG. 6 shows an example of response output waveforms when the conventional flow meter and the flow meter 1 of this embodiment mode are arranged within the flow path of a vacuum circuit and the flow path is instantaneously interrupted. The flow meter 1 outputs a voltage proportional to the flow rate, and outputs 1 V when the flow rate is zero. When the flow meter 1 is used in a chip mounter and chip suction holding is confirmed, it is judged that the chip is appropriately held when the output voltage is 1 V. As shown in FIG. 6, in the conventional example showing the output waveform of the conventional flow meter, about 28 milliseconds are required until the output voltage is completely lowered to 1 V or less by the influence of inertia of the air. However, in the embodiment showing the output of the flow meter 1 of this embodiment mode, the time required to lower the output voltage to 1 V or less is about 3 milliseconds. Accordingly, it has been confirmed that the flow meter is operated at very high speed.

The flow meter of the present invention can be also applied to a semiconductor wafer chuck, an adsorbing device of a thin film part, flow rate monitoring of an air duct, air-fuel ratio management of a fuel device, flow control, etc. as well as the high speed mounting machine of the chip mounter.

What is claimed is:

1. A flow meter comprising:
    a main body having a groove portion opened in an upper portion and also having connecting portions for communicating said groove portion and an exterior at both ends of the groove portion;
    a detachable cover body comprising a first face and a second face, said first face sealing the opened upper portion of said groove portion to constitute a measuring chamber having a rectangular sectional shape in which a measured fluid is flowed; and
    a circuit substrate coming in close contact with a second face of said cover body;
    wherein said groove portion comprises a bottom wall and two side walls:
    a sensor hole opened to said measuring chamber is arranged in said cover body;
    a flow sensor is disposed on said circuit substrate so as to be arranged within said sensor hole and set a detecting face to face said measuring chamber; and
    said sensor hole is sealed by said circuit substrate.

2. The flow meter according to claim 1, wherein the detecting face of said flow sensor is between a plane of said first face and a plane of said second face of said cover body, and faces the plane of the first face of said cover body.

3. The flow meter according to claim 1, wherein meshed net bodies are engaged with grooves arranged in said main body and said cover body and are fixed on an upstream side and a downstream side of said flow sensor of said measuring chamber.

4. The flow meter according to claim 1, wherein said connecting portion has a joint member constructed by a hard material.

5. The flow meter according to claim 2, wherein meshed net bodies are engaged with grooves arranged in said main body and said cover body and are fixed on an upstream side and a downstream side of said flow sensor of said measuring chamber.

6. The flow meter according to claim 2, wherein said connecting portion has a joint member constructed by a hard material.

7. The flow meter according to claim 3, wherein said connecting portion has a joint member constructed by a hard material.

8. The flow meter according to claim 5, wherein said connecting portion has a joint member constructed by a hard material.

* * * * *